United States Patent
Ohishi et al.

(10) Patent No.: US 11,637,966 B2
(45) Date of Patent: Apr. 25, 2023

(54) IMAGING DEVICE AND DIAPHRAGM MECHANISM CONTROL METHOD

(71) Applicant: SONY GROUP CORPORATION, Tokyo (JP)

(72) Inventors: Chikara Ohishi, Tokyo (JP); Yoshinori Yamatsuta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/597,279

(22) PCT Filed: May 24, 2020

(86) PCT No.: PCT/JP2020/020436
§ 371 (c)(1),
(2) Date: Dec. 30, 2021

(87) PCT Pub. No.: WO2021/010022
PCT Pub. Date: Jan. 21, 2021

(65) Prior Publication Data
US 2022/0321752 A1 Oct. 6, 2022

(30) Foreign Application Priority Data
Jul. 12, 2019 (JP) .............................. JP2019-130100

(51) Int. Cl.
*H04N 5/225* (2006.01)
*H04N 5/238* (2006.01)

(52) U.S. Cl.
CPC .................................. *H04N 5/238* (2013.01)

(58) Field of Classification Search
CPC ................................................. H04N 5/23212
See application file for complete search history.

(56) References Cited

U.S. PATENT DOCUMENTS 8,064,762 B2 * 11/2011 Mizukami ............. H04N 5/238
396/257
9,456,145 B2 * 9/2016 Ueno ....................... G03B 7/17
(Continued)

FOREIGN PATENT DOCUMENTS

| CN | 104702838 A | 6/2015 |
| EP | 2882181 A1 | 6/2015 |

(Continued)

OTHER PUBLICATIONS

International Search Report and Written Opinion of PCT Application No. PCT/JP2020/020436, dated Aug. 18, 2020, 08 pages of ISRWO.

*Primary Examiner* — Gary C Vieaux
(74) *Attorney, Agent, or Firm* — Chip Law Group

(57) ABSTRACT

An object is to improve accuracy of autofocus control. Accordingly, an imaging device according to the present technology includes an autofocus control unit that performs operation of autofocus according to a predetermined manipulation, and a diaphragm mechanism control unit that performs opening and closing control of a diaphragm mechanism according to an amplification factor of a distance measurement signal during the operation of autofocus. Thus, during the operation of autofocus, control different from control of the diaphragm mechanism based on an imaging setting is performed, and accuracy of the autofocus control is improved.

13 Claims, 8 Drawing Sheets

| | | LIVE VIEW | | DURING AF CONTROL (HALF-PRESS OF SHUTTER BUTTON) | AT TIME OF STILL IMAGE CAPTURING (PRESS OF SHUTTER BUTTON) |
|---|---|---|---|---|---|
| FOCUS PRIORITY MODE | IMAGING SETTING REFLECTION ON | DIAPHRAGM VALUE ACCORDING TO AMPLIFICATION FACTOR | | DIAPHRAGM VALUE ACCORDING TO AMPLIFICATION FACTOR | DIAPHRAGM VALUE ACCORDING TO IMAGING SETTING |
| | IMAGING SETTING REFLECTION OFF | DIAPHRAGM VALUE ACCORDING TO AMPLIFICATION FACTOR | | | |
| OPERATION SPEED PRIORITY MODE | IMAGING SETTING REFLECTION ON | DIAPHRAGM VALUE ACCORDING TO IMAGING SETTING | | DIAPHRAGM VALUE ACCORDING TO IMAGING SETTING | DIAPHRAGM VALUE ACCORDING TO IMAGING SETTING |
| | IMAGING SETTING REFLECTION OFF | DIAPHRAGM VALUE BY STANDARD DIAPHRAGM CONTROL | | | |

(56) References Cited

U.S. PATENT DOCUMENTS

| | | |
|---|---|---|
| 2009/0256951 A1 | 10/2009 | Yumiki |
| 2015/0163395 A1 | 6/2015 | Konishi et al. |
| 2017/0289438 A1 | 10/2017 | Maruyama et al. |

FOREIGN PATENT DOCUMENTS

| | | |
|---|---|---|
| JP | 8-122626 A | 5/1996 |
| JP | 2009-251557 A | 10/2009 |
| JP | 2014-038248 A | 2/2014 |
| JP | 2015-108778 A | 6/2015 |
| JP | 2017-187743 A | 10/2017 |
| JP | 2019-103030 A | 6/2019 |
| KR | 10-2015-0065566 A | 6/2015 |
| RU | 2014137669 A | 4/2016 |

\* cited by examiner

FIG. 7

| | | LIVE VIEW | DURING AF CONTROL (HALF-PRESS OF SHUTTER BUTTON) | AT TIME OF STILL IMAGE CAPTURING (PRESS OF SHUTTER BUTTON) |
|---|---|---|---|---|
| FOCUS PRIORITY MODE | IMAGING SETTING REFLECTION ON | DIAPHRAGM VALUE ACCORDING TO AMPLIFICATION FACTOR | DIAPHRAGM VALUE ACCORDING TO AMPLIFICATION FACTOR | DIAPHRAGM VALUE ACCORDING TO IMAGING SETTING |
| | IMAGING SETTING REFLECTION OFF | DIAPHRAGM VALUE ACCORDING TO AMPLIFICATION FACTOR | | |
| OPERATION SPEED PRIORITY MODE | IMAGING SETTING REFLECTION ON | DIAPHRAGM VALUE ACCORDING TO IMAGING SETTING | DIAPHRAGM VALUE ACCORDING TO IMAGING SETTING | DIAPHRAGM VALUE ACCORDING TO IMAGING SETTING |
| | IMAGING SETTING REFLECTION OFF | DIAPHRAGM VALUE BY STANDARD DIAPHRAGM CONTROL | | |

IMAGING DEVICE AND DIAPHRAGM MECHANISM CONTROL METHOD

CROSS REFERENCE TO RELATED APPLICATIONS

This application is a U.S. National Phase of International Patent Application No. PCT/JP2020/020436 filed on May 24, 2020, which claims priority benefit of Japanese Patent Application No. JP 2019-130100 filed in the Japan Patent Office on Jul. 12, 2019. Each of the above-referenced applications is hereby incorporated herein by reference in its entirety.

TECHNICAL FIELD

The present technology relates to an imaging device including a diaphragm mechanism and a diaphragm mechanism control method.

BACKGROUND ART

Among others, there are imaging devices that include a diaphragm mechanism for optimizing a light reception amount of an imaging element. Furthermore, among others, there are imaging devices that can execute autofocus control. Moreover, there are also imaging devices capable of performing the autofocus control while including the diaphragm mechanism (for example, Patent Document 1).

In a case where the autofocus control is performed in an imaging device that includes the diaphragm mechanism, there is an imaging device that performs following of a focus in a state where a diaphragm value of the diaphragm mechanism according to imaging setting is maintained.

CITATION LIST

Patent Document

Patent Document 1: Japanese Patent Application Laid-Open No. 2019-103030

SUMMARY OF THE INVENTION

Problems to be Solved by the Invention

However, in a case where imaging is performed in a dark environment where the amount of light tends to be insufficient, distance measurement accuracy decreases due to that the amount of light incident on the imaging element is insufficient, and thus there is a possibility that accuracy of autofocus control decreases.

Therefore, an object of the present technology is to improve accuracy of autofocus control.

Solutions to Problems

An imaging device according to the present technology includes an autofocus control unit that performs operation of autofocus according to a predetermined manipulation, and a diaphragm mechanism control unit that performs opening and closing control of a diaphragm mechanism according to an amplification factor of a distance measurement signal during the operation of autofocus.

Thus, during the operation of autofocus, control different from control of the diaphragm mechanism based on imaging setting is performed.

The diaphragm mechanism control unit in the above-described imaging device may perform specific diaphragm opening control of decreasing a diaphragm value of the diaphragm mechanism in a case where the amplification factor is equal to or more than a predetermined value during the operation of autofocus.

Thus, an increase in noise components is suppressed in a case where imaging is performed in a dark environment or the like where the light reception amount of the imaging element tends to be insufficient.

The diaphragm mechanism control unit in the above-described imaging device may set the diaphragm value of the diaphragm mechanism to a minimum value as the specific diaphragm opening control in a case where the amplification factor is equal to or more than the predetermined value during the operation of autofocus.

That is, in a case where the amplification factor is equal to or more than the predetermined value, control is performed to open the diaphragm mechanism to the maximum.

The diaphragm mechanism control unit in the above-described imaging device may cause the diaphragm value of the diaphragm mechanism to become a first diaphragm value according to an imaging setting in a case where the amplification factor is less than the predetermined value during the operation of autofocus.

The first diaphragm value according to the imaging setting is, for example, a diaphragm value according to the setting of the imaging person, a diaphragm value automatically calculated on the basis of the imaging environment at a time of automatic setting, or the like.

Thus, for example, if it is still image capturing, setting of the diaphragm value of the diaphragm mechanism is equivalent to the diaphragm value applied at a time of pressing the shutter button, or the like.

The diaphragm mechanism control unit in the above-described imaging device may perform the specific diaphragm opening control in a case where the amplification factor is equal to or more than the predetermined value during non-operation of autofocus and during display of a live view image.

During display of the live view image, a diaphragm mechanism different from the imaging setting is controlled.

The above-described imaging device may include a switching control unit that switches between a focus priority mode and an operation speed priority mode, in which the diaphragm mechanism control unit may perform the specific diaphragm opening control in a case where the amplification factor is equal to or more than the predetermined value during the operation of autofocus in the focus priority mode, and cause a diaphragm value of the diaphragm mechanism to be a first diaphragm value according to an imaging setting during the operation of autofocus in the operation speed priority mode.

Thus, in the focus priority mode, the amplification factor can be reduced by opening the diaphragm mechanism.

The above-described imaging device may include a manipulation element that switches between the focus priority mode and the operation speed priority mode.

Thus, the focus priority mode and the operation speed priority mode can be switched by the will of the imaging person.

In the above-described imaging device, whether or not to reflect the imaging setting in a display image to be displayed on a display unit may be switchable, and the diaphragm mechanism control unit may cause the diaphragm value of the diaphragm mechanism to be the first diaphragm value according to the imaging setting in a case of reflecting the imaging setting during non-operation of autofocus and during display of a live view image in the operation speed priority mode, and perform the specific diaphragm opening control in a case where the amplification factor is equal to or more than the predetermined value either in a case of reflecting the imaging setting or a case of not reflecting the imaging setting during non-operation of autofocus and during display of the live view image in the focus priority mode.

Thus, in the focus priority mode, the specific diaphragm opening control is executed regardless of whether or not the imaging setting is reflected. That is, the diaphragm mechanism can be opened in the display of the live view image.

The diaphragm mechanism control unit in the above-described imaging device may set a diaphragm value in such a manner that the amplification factor is less than a predetermined value.

For example, the diaphragm mechanism is opened so as to suppress the amplification factor of the automatic gain control to be less than the predetermined value.

The diaphragm mechanism control unit in the above-described imaging device may set the diaphragm value to a second diaphragm value closest to the first diaphragm value after a condition with respect to the amplification factor is satisfied during the operation of autofocus.

Thus, the diaphragm value can be made close to the imaging setting while securing the light reception amount of the imaging element.

In the above-described imaging device, the distance measurement signal may be a distance measurement signal output on the basis of an image plane phase difference pixel.

Since the distance measurement signal using the image plane phase difference pixel increases in noise accompanying an increase in amplification factor, distance measurement accuracy decreases. Therefore, there is a possibility that the accuracy of the autofocus control based on the distance measurement signal decreases. According to this configuration, since the amplification factor is suppressed to be low by appropriate control of the diaphragm mechanism, an appropriate distance measurement signal can be acquired.

The diaphragm mechanism control unit in the above-described imaging device may perform opening and closing control of the diaphragm mechanism according to the amplification factor in a still image capturing mode.

During recording in the moving image capturing mode, it is difficult to apply a setting of the diaphragm mechanism different from the imaging setting since it is in a state where the captured image is always recorded.

A diaphragm mechanism control method according to the present technology performs opening and closing control of a diaphragm mechanism according to an amplification factor of a distance measurement signal during operation of autofocus according to a predetermined manipulation.

BRIEF DESCRIPTION OF DRAWINGS

FIG. 7 is an explanatory diagram illustrating a relationship among diaphragm values set in each state.

MODE FOR CARRYING OUT THE INVENTION

Hereinafter, embodiments will be described in the following order with reference to the accompanying drawings.
<1. Configuration of imaging device>
<2. Functional configuration of camera control unit>
<3. First example of diaphragm value setting processing>
<4. Second example of diaphragm value setting processing>
<5. Modification example>
<6. Summary>
<7. Present technology>

1. Configuration of Imaging Device

Figure 1:
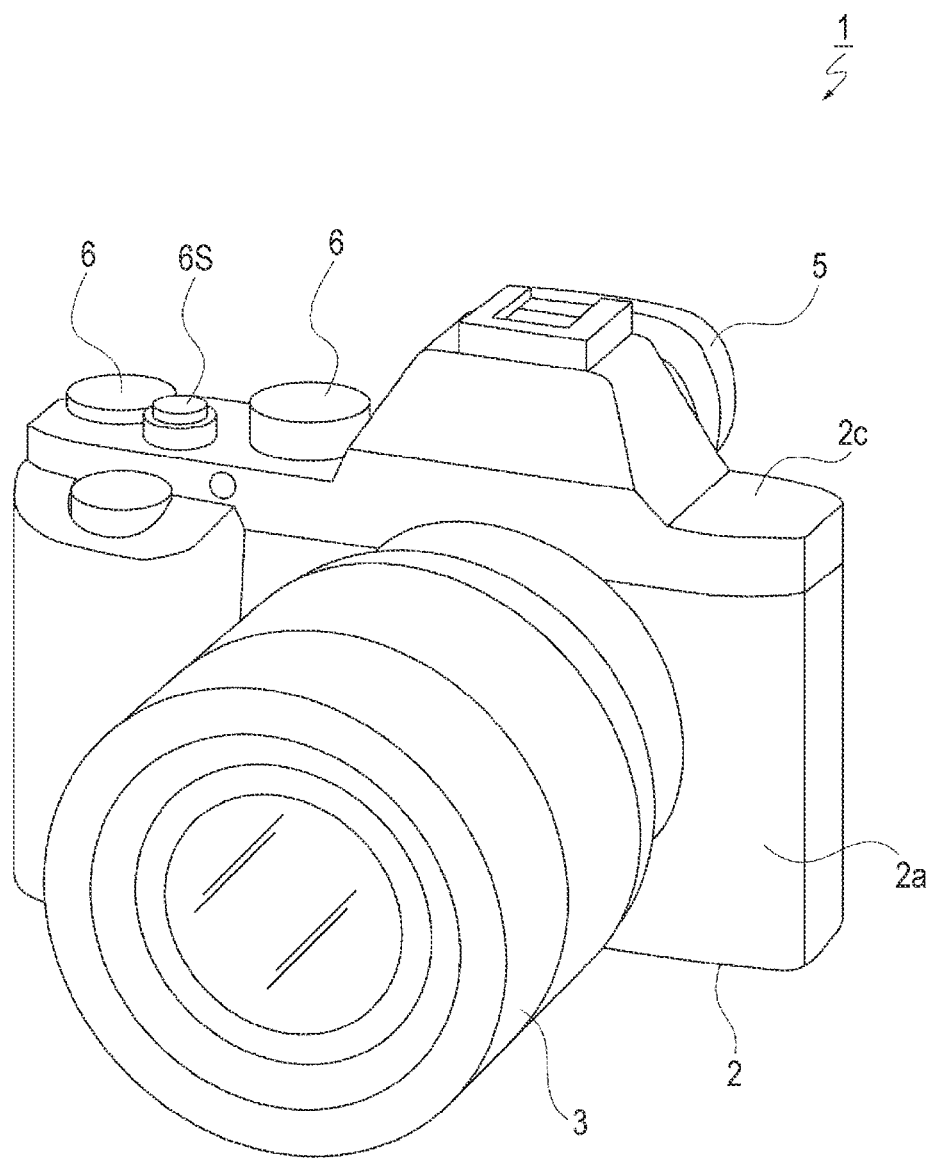
FIG. 1 is a perspective view of an imaging device of an embodiment of the present technology.

FIG. 1 illustrates an external appearance of an imaging device 1 according to the present embodiment.

Note that in each of the following examples, description will be made with a subject side being front and an imaging person side being rear, but these directions are for convenience of description, it is not limited to these directions for implementation of the present technology.

Figure 2:
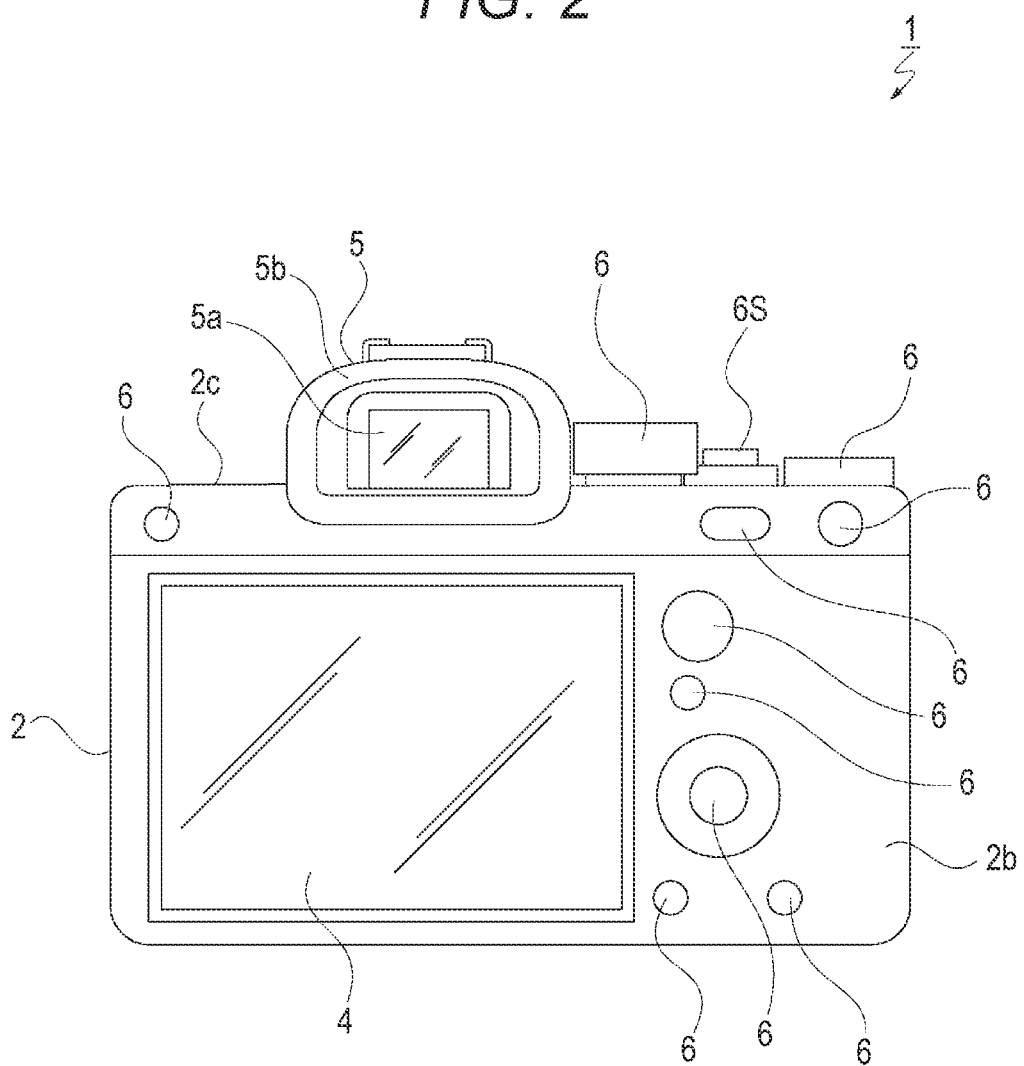
FIG. 2 is a rear view of the imaging device.

As illustrated in FIGS. 1 and 2, the imaging device 1 includes a camera housing 2 in which necessary respective units are arranged inside and outside, and a lens barrel 3 attached to a front surface portion 2a of the camera housing 2.

A rear monitor 4 is arranged on a rear surface portion 2b of the camera housing 2. A through image, a recorded image, and the like are displayed on the rear monitor 4.

The rear monitor 4 is, for example, a display device such as a liquid crystal display (LCD) or an organic electroluminescence (EL) display.

The rear monitor 4 is rotatable with respect to the camera housing 2. For example, an upper end portion of the rear monitor 4 is set as a rotation axis, and a lower end portion of the rear monitor 4 is rotatable so as to move backward.

Note that a right end portion or a left end portion of the rear monitor 4 may be used as the rotation axis. Moreover, it may be rotatable in directions around a plurality of axes.

An electric viewfinder (EVF) 5 is arranged on an upper surface portion 2c of the camera housing 2. The EVF 5 includes an EVF monitor 5a and a frame-shaped enclosing part 5b projecting backward so as to surround upper and left and right sides of the EVF monitor 5a.

The EVF monitor 5a is formed using an LCD, an organic EL display, or the like. Note that an optical view finder (OVF) may be provided instead of the EVF monitor 5a.

Various manipulation elements 6 are provided on the rear surface portion 2b and the upper surface portion 2c. Examples of the manipulation elements 6 include a reproduction menu activation button, a determination button, a cross key, a cancel button, a zoom key, a slide key, a release button (shutter button), and the like.

The various manipulation elements 6 include elements in various modes such as a button, a dial, and a pressable and rotatable composite manipulation element. With the manipulation element 6 of various modes, for example, a menu manipulation, a reproduction manipulation, a mode selection-switching manipulation, a focus manipulation, a zoom manipulation, and selection and setting of parameters such as a shutter speed and an F-number can be performed.

In the following description, the release button will be described as a shutter button 6S. The shutter button 6S allows a shutter manipulation or an autofocus (AF) manipulation by half-pressing.

Figure 3:
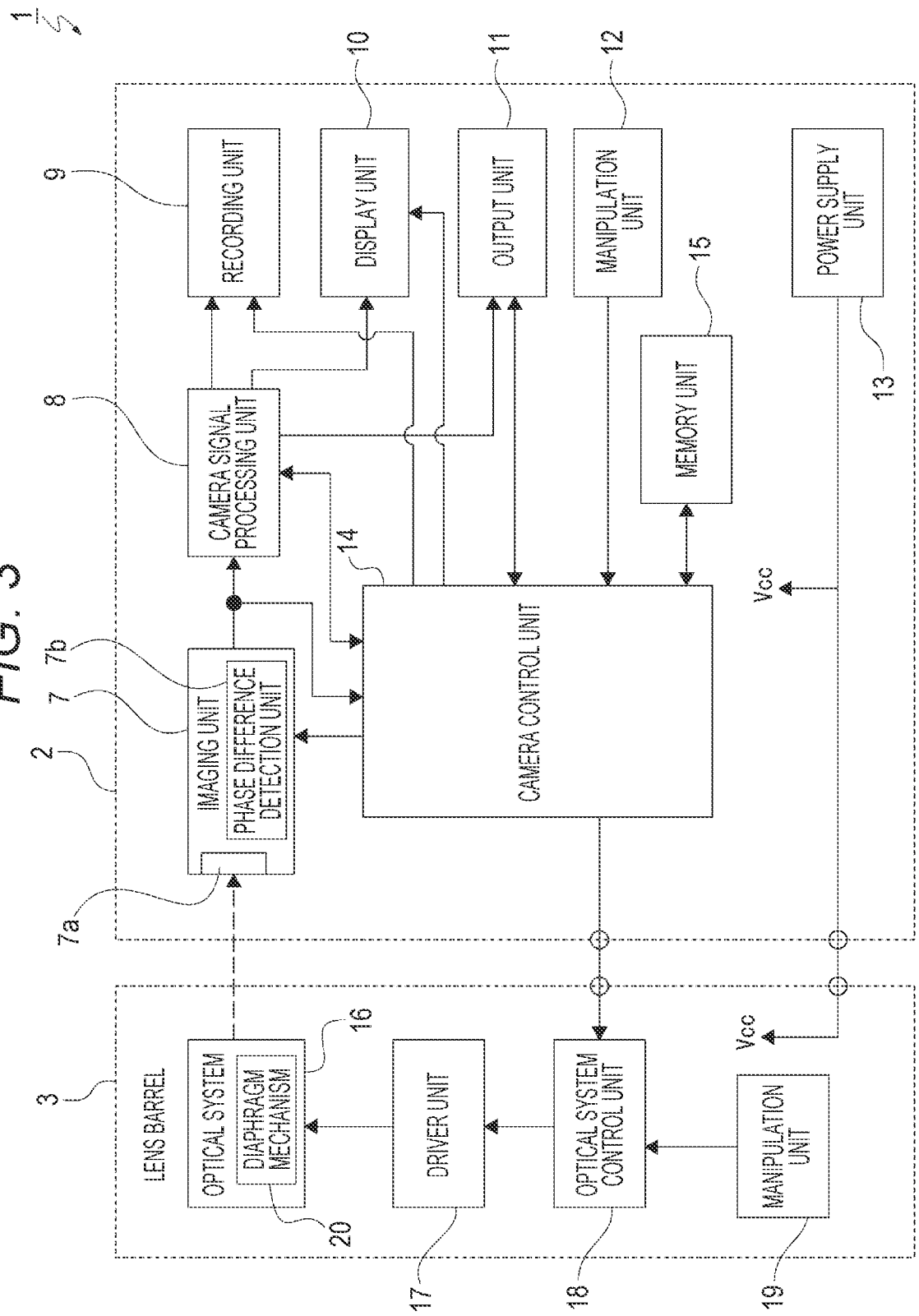
FIG. 3 is a block diagram of the imaging device.
Figure 4:
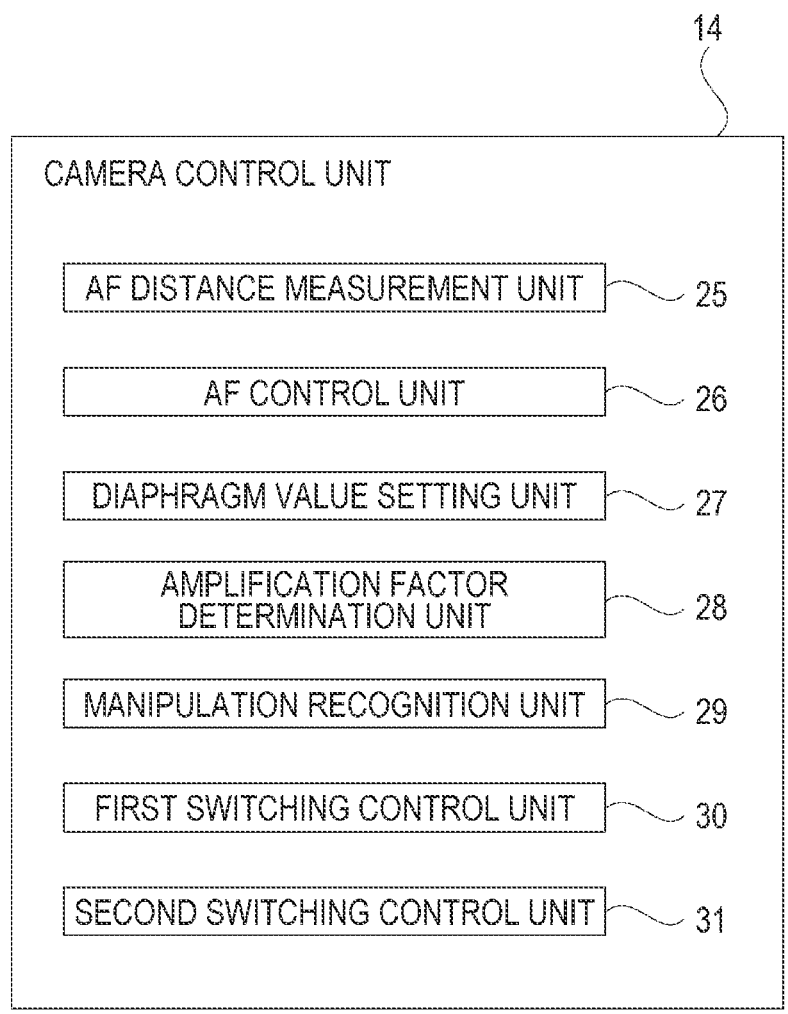
FIG. 4 is a functional block diagram of a camera control unit.

FIGS. 3 and 4 are block diagrams of the imaging device 1. An imaging unit 7, a camera signal processing unit 8, a recording unit 9, a display unit 10, an output unit 11, a manipulation unit 12, a power supply unit 13, a camera control unit 14, a memory unit 15, and the like are provided inside and outside the camera housing 2 of the imaging device 1.

The lens barrel 3 includes an optical system 16, a driver unit 17, an optical system control unit 18, a manipulation unit 19, and the like.

The optical system 16 includes various lenses such as an incident end lens, a zoom lens, a focus lens, and a condenser lens, a diaphragm mechanism 20 that performs exposure control by adjusting, for example, an aperture amount of a lens or an iris (diaphragm) so that sensing is performed in a state where signal charges are not saturated and are within a dynamic range, and a shutter unit such as a focal plane shutter.

Note that a part of each unit constituting the optical system 16 may be provided in the camera housing 2.

The imaging unit 7 includes, for example, a charge coupled device (CCD) type or complementary metal-oxide semiconductor (CMOS) type imaging element 7a and a phase difference detection unit 7b that detects a phase difference for acquiring distance information, and performs exposure control of light from a subject incident via the optical system 16.

A sensor surface of the imaging element 7a includes a sensing element in which a plurality of pixels is two-dimensionally arranged.

The imaging element 7a includes imaging pixels for capturing an image of a subject and image plane phase difference pixels for detecting a phase difference of an optical image of the subject.

The imaging unit 7 performs, for example, correlated double sampling (CDS) processing, automatic gain control (AGC) processing, and the like, and further performs analog/digital (A/D) conversion processing on an electrical signal obtained by photoelectrically converting light received by the imaging element 7a. The imaging unit 7 outputs a captured image signal as digital data to the camera signal processing unit 8 and the camera control unit 14.

The phase difference detection unit 7b detects phase difference information used to calculate a defocus amount. The phase difference detection unit 7b is, for example, the image plane phase difference pixels in the imaging unit 7.

The image plane phase difference pixels (phase difference detection unit 7b) detect a pair of phase difference signals, and the imaging unit 7 outputs the pair of phase difference signals detected by the image plane phase difference pixels. The phase difference signals are used for correlation calculation for calculating a defocus amount.

The imaging unit 7 outputs the phase difference signals to the camera signal processing unit 8 and the camera control unit 14.

Figure 5:
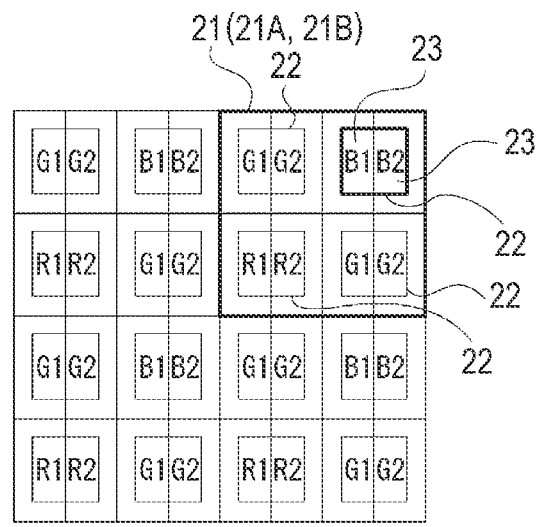
FIG. 5 is a configuration example of image plane phase difference pixels.

In the imaging element 7a, for example, one pixel 21 includes two columns×two rows of subpixels 22 (see FIG. 5). Each of the subpixels 22 is covered with a Bayer array color filter, and is one of a subpixel having spectral sensitivity of red (R), a subpixel having spectral sensitivity of green (G), and a subpixel having spectral sensitivity of blue (B) depending on the type of color filter.

Each subpixel 22 includes a plurality of photodiodes (photoelectric conversion units) 23 for one microlens in order to detect a phase difference signal. For example, as illustrated in FIG. 5, each subpixel 22 includes two photodiodes 23 and 23 arranged in two columns×one row.

The captured image signal and the phase difference signal can be acquired by arranging a large number of pixels 21 including two columns×two rows of subpixels 22 (that is, four columns×two rows of photodiodes) on an imaging surface.

In each subpixel 22, a light flux is separated by a microlens, and an image is formed on each of the two photodiodes 23 and 23. Then, the captured image signal and the phase difference signal are read out by the signals from the respective photodiodes 23.

In this case, each pixel 21 functions as an image plane phase difference pixel 21A.

Figure 6:
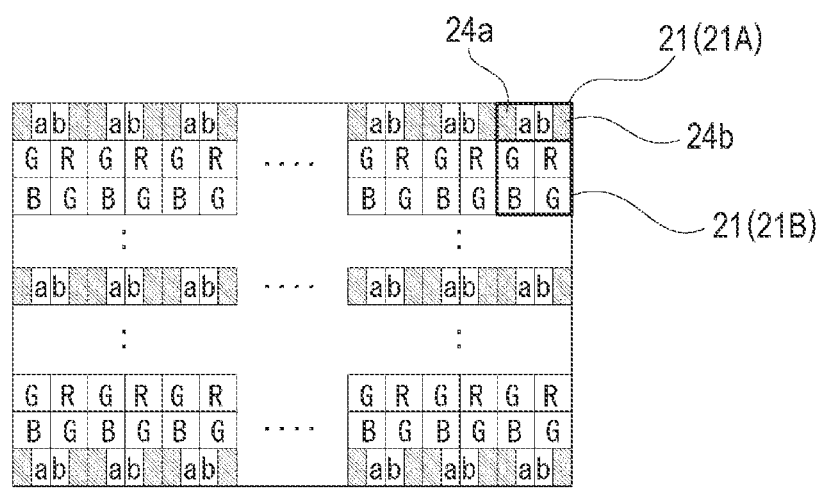
FIG. 6 is another configuration example of the image plane phase difference pixels.

Furthermore, the imaging element 7a is not limited to the configuration in which all the pixels 21 have a plurality of subpixels 22 to form the image plane phase difference pixel 21A, and as illustrated in FIG. 6, only a part of the pixels 21 may be provided as the image plane phase difference pixel 21A, and such image plane phase difference pixels 21A may be discretely provided. In this case, imaging pixels 21B and the image plane phase difference pixels 21A are provided together in the imaging element 7a.

For example, in a case where the pupil region of the imaging lens is divided into two left and right divided regions, the image plane phase difference pixel 21A is provided with a first phase difference detection pixel 24a that receives a light flux incident from the left divided region and a phase difference detection pixel 24b that receives a light flux incident from the right divided region. The phase difference signal of the image of the subject for each divided region is output from the phase difference detection pixel 24a and the phase difference detection pixel 24b.

For a region where the image plane phase difference pixel 21A is not provided, the phase difference at each pixel position is interpolated by interpolation processing by the camera signal processing unit 8.

In the imaging pixels 21B, each subpixel 22 is covered with a Bayer array color filter, and a captured image signal can be read from an electric signal obtained by photoelectrically converting light received by the imaging pixel 21B.

As described above, the image plane phase difference pixel 21A may be formed integrally with R, G, and B imaging pixels (FIG. 5), or may be discretely arranged (FIG. 6). According to each of these aspects, the defocus amount can be accurately calculated in units of several μm pixels from the read phase difference signal.

Note that the phase difference detection unit 7b may be a phase difference sensor provided separately from the imaging unit 7. For example, a configuration is assumed in which a light beam guided from the optical system 16 of the imaging device 1 is divided into transmitted light toward the imaging unit 7 and reflected light toward the phase difference sensor by transmitting through a translucent mirror, and the phase difference sensor receives the divided reflected light to thereby detect the phase difference signal.

The camera signal processing unit 8 includes, for example, a microprocessor specialized in digital signal processing such as a digital signal processor (DSP), a microcomputer, or the like.

The camera signal processing unit 8 includes respective units for performing various types of signal processing on a digital signal (captured image signal) transmitted from the imaging unit 7.

Specifically, processing such as correction processing among R, G, and B color channels, white balance correction, aberration correction, and shading correction is performed.

Furthermore, the camera signal processing unit 8 performs each processing of YC generation processing of generating (separating) a luminance (Y) signal and a color (C) signal from the image data of R, G, and B, processing of adjusting luminance and color, processing such as knee correction and gamma correction, and the like.

Moreover, the camera signal processing unit 8 performs conversion into a final output format by performing resolution conversion processing, codec processing to perform encoding for recording or communication, and the like. The image data converted into the final output format is stored in the memory unit 15. Furthermore, by outputting the image data to the display unit 10, an image is displayed on the rear monitor 4 or the EVF monitor 5a. Moreover, by outputting from an external output terminal, it is displayed on a device such as a monitor provided outside the imaging device 1.

The recording unit 9 includes, for example, a nonvolatile memory, and functions as a storage means that stores image files (content files) such as still image data and moving image data, attribute information of the image files, thumbnail images, and the like.

Image files are stored in formats such as Joint Photographic Experts Group (JPEG), Tagged Image File Format (TIFF), or Graphics Interchange Format (GIF), for example.

The actual form of the recording unit 9 can be considered in various ways. For example, the recording unit 9 may be configured as a flash memory built in the imaging device 1, or may be configured by a memory card (for example, a portable flash memory) that can be attached to and detached from the imaging device 1 and an access unit that accesses the memory card for storage and reading. Furthermore, it may be implemented as a hard disk drive (HDD) or the like as a form built in the imaging device 1.

The display unit 10 executes processing for performing various displays for the imaging person. The display unit 10 is, for example, the rear monitor 4 or the EVF monitor 5a. The display unit 10 performs processing of displaying the image data converted into an appropriate resolution input from the camera signal processing unit 8. Accordingly, what is called a through image, which is a captured image during standby for release, is displayed.

Note that, in the following description, a state where a through image is displayed on the display unit 10 and AF control is not executed will be referred to as "live view".

Moreover, the display unit 10 implements display as a graphical user interface (GUI), such as various manipulation menus, icons, and messages, on the screen on the basis of an instruction from the camera control unit 14.

Furthermore, the display unit 10 can display a reproduced image of the image data read from the recording medium in the recording unit 9.

Note that, in the present example, both the EVF monitor 5a and the rear monitor 4 are provided, but the embodiment of the present technology is not limited to such a configuration, and only one of the EVF monitor 5a and the rear monitor 4 may be provided, or either one or both of the EVF monitor 5a and the rear monitor 4 may be detachable.

The output unit 11 performs data communication and network communication with an external device by wire or wirelessly. For example, captured image data (a still image file or a moving image file) is transmitted to an external display device, recording device, reproduction device, or the like.

Furthermore, the output unit 11 may function as a network communication unit. For example, communication may be performed by various networks such as the Internet, a home network, and a local area network (LAN), and various data may be transmitted and received to and from a server, a terminal, or the like on the network.

The manipulation unit 12 provided in the camera housing 2 includes not only the above-described various manipulation elements 6 but also the rear monitor 4 employing a touch panel system and the like, and outputs manipulation information corresponding to various manipulations such as a tap manipulation and a swipe manipulation of the imaging person to the camera control unit 14.

Note that the manipulation unit 12 may function as a reception unit of an external manipulation device such as a remote controller separate from the imaging device 1.

The power supply unit 13 generates a power supply voltage Vcc needed for each unit from, for example, a battery loaded inside, and supplies the voltage as an operating voltage.

In a state where the lens barrel 3 is attached to the imaging device 1, the power supply voltage Vcc by the power supply unit 13 is also supplied to a circuit inside the lens barrel 3.

Note that in the power supply unit 13, a circuit that charges the battery or a circuit that generates the power supply voltage Vcc may be formed, using a DC voltage converted and input by an AC adapter connected to a commercial AC power supply as the power supply.

The camera control unit 14 includes a microcomputer (arithmetic processing device) including a central processing unit (CPU), and performs overall control of the imaging device 1. For example, control of the shutter speed according to a manipulation of the imaging person, an instruction on various types of signal processing in the camera signal processing unit 8, imaging operation and recording operation according to a manipulation of the user, and reproduction operation of the recorded image file are performed.

The camera control unit 14 switches various image capturing modes and the like. Examples of the various image capturing modes include a still image capturing mode, a moving image capturing mode, a consecutive image capturing mode for consecutively acquiring still images, and the like.

Furthermore, the camera control unit 14 executes mode switching such as an operation speed priority mode and a focus priority mode, and processing of switching whether or not to reflect various imaging settings on the through image that can be checked on the display unit 10. The various imaging settings are, for example, settings related to effects and the like that affect the captured image, such as an adjustment value of white balance, a setting value of a diaphragm value, and a setting value of a shutter speed, and the like.

Note that in a case where either the operation speed priority mode or the focus priority mode is selected, the camera control unit 14 may perform display control such that display for notification of the mode being selected is executed on the display unit 10. The notification on the display unit 10 may be performed, for example, by displaying an icon image or by displaying characters or the like. Further, the display for the notification may be executed only for a predetermined time after the mode is selected, or may be executed until the other mode is selected next. Furthermore, the display of these notifications may be switchable between presence and absence of display by a user manipulation.

Furthermore, the camera control unit 14 instructs the optical system control unit 18 to control various lenses included in the optical system 16.

For example, processing of designating a diaphragm value in order to secure a light amount necessary for AF control, an operation instruction of the diaphragm mechanism according to the diaphragm value, and the like are performed.

The camera control unit 14 can acquire information regarding various lenses included in the optical system 16 via the optical system control unit 18. The information of the lens includes, for example, information of a model number of the lens, a position of the zoom lens, and an F value, information of an exit pupil position, or the like. Furthermore, the camera control unit 14 can acquire the diaphragm value of the diaphragm mechanism 20 included in the optical system 16.

The memory unit 15 stores information and the like used for processing executed by the camera control unit 14. The illustrated memory unit 15 comprehensively indicates, for example, a read only memory (ROM), a random access memory (RAM), a flash memory, and the like.

The memory unit 15 may be a memory area built in the microcomputer chip as the camera control unit 14, or may include a separate memory chip.

Programs and the like used by the camera control unit 14 are stored in the ROM, the flash memory, and the like of the memory unit 15. The ROM, the flash memory, and the like store an operating system (OS) for the CPU to control each unit, content files such as image files, and application programs, firmware, and the like for various operations.

The camera control unit 14 executes the program to control the entirety of the imaging device 1 and the lens barrel 3.

The RAM of the memory unit 15 is used as a work area of the camera control unit 14 by temporarily storing data, programs, and the like used in various data processing executed by the CPU of the camera control unit 14.

The optical system control unit 18 of the lens barrel 3 includes, for example, a microcomputer, and outputs a control signal to the driver unit 17 to actually drive various lenses of the optical system 16 on the basis of an instruction from the camera control unit 14.

Note that information communication between the camera control unit 14 and the optical system control unit 18 may be enabled only in a state where the lens barrel 3 is attached to the camera housing 2, or may be enabled in a state where the lens barrel 3 is not attached to the camera housing 2 by wireless communication.

The driver unit 17 is provided with, for example, a motor driver for a zoom lens drive motor, a motor driver for a focus lens drive motor, a diaphragm mechanism driver 17a for a motor that drives the diaphragm mechanism 20, and the like.

Each driver such as the diaphragm mechanism driver 17a supplies a drive current to the corresponding drive motor according to an instruction from the optical system control unit 18.

The manipulation unit 19 of the lens barrel 3 represents a manipulation element provided on the side of lens barrel 3. Manipulation information by the manipulation unit 19 is supplied to the optical system control unit 18, and the camera control unit 14 is notified of the manipulation information via the optical system control unit 18.

Operation control of the optical system 16 by the optical system control unit 18 and various settings and operation control by the camera control unit 14 are performed according to a manipulation of the manipulation unit 19.

The manipulation unit 19 may function as a reception unit of an external manipulation device such as a remote controller separate from lens barrel 3.

2. Functional Configuration of Camera Control Unit

FIG. 4 is a diagram obtained by extracting a part of the configuration of FIG. 3, and is a diagram illustrating a functional configuration of the camera control unit 14 for performing the operation of the imaging device 1 of the present embodiment.

As functions of the camera control unit 14, an AF distance measurement unit 25, an AF control unit 26, a diaphragm value setting unit 27, an amplification factor determination unit 28, a manipulation recognition unit 29, a first switching control unit 30 that switches between the focus priority mode and the operation speed priority mode, and a second switching control unit 31 that switches whether or not to reflect an imaging setting in the through image are provided.

The AF distance measurement unit 25 performs distance measurement processing for performing AF control. Specifically, the defocus amount is detected on the basis of phase difference signal of each pixel obtained by the imaging unit 7. Furthermore, the AF distance measurement unit 25 may be capable of executing arithmetic processing for performing AF control by a contrast detection method. Of course, calculations for performing the AF control by the hybrid AF method having features of the phase difference detection method and the contrast detection method may be executable.

The AF control unit 26 generates an AF control signal on the basis of the control value calculated by the AF distance measurement unit 25, and performs processing for executing the AF operation. The AF control signal by the AF control unit 26 is output to the optical system control unit 18. The optical system control unit 18 controls the driver unit 17 on the basis of the AF control signal to drive the focus lens in the optical system 16 and perform the AF operation.

The diaphragm value setting unit 27 sets the diaphragm value of the diaphragm mechanism 20 for implementing the imaging setting. Furthermore, in a case where the focus priority mode is set, a diaphragm value different from the imaging setting may be set. Specifically, in order to appropriately perform the AF control, a low diaphragm value is set so as to secure the light reception amount of the imaging element 7a.

For example, the amplification factor determination unit 28 acquires the amplification factor in the AGC processing and compares the acquired amplification factor with a predetermined value to determine whether or not the amplification factor is equal to or more than the predetermined value. In a case where the amplification factor is equal to or more than the predetermined value, there is a possibility that accuracy of AF control cannot be secured due to an increase in noise components. Accordingly, in a case where AF control is being executed and the amplification factor is equal to or more than the predetermined value, the amplification factor determination unit 28 instructs the diaphragm value setting unit 27 to decrease the diaphragm value. Thus, the diaphragm mechanism 20 is opened, and the light reception amount of the imaging element 7a increases.

The manipulation recognition unit 29 receives a detection signal output from each manipulation unit 12 by detecting various manipulations by the imaging person, and recognizes manipulation content.

For example, a manipulation detection signal output from the shutter button 6S accompanying that the shutter button 6S is half-pressed in the still image capturing mode is received and a half-pressed state of the shutter button 6S is grasped, to thereby recognize that a manipulation to start the AF operation is performed. In this case, the manipulation recognition unit 29 instructs the AF control unit 26 to start execution of the AF control. Thus, the above-described AF operation by the AF control unit 26 is implemented. Note that the manipulation recognition unit 29 may implement the AF operation by instructing the AF distance measurement unit 25 to start detecting the defocus amount.

The manipulation recognition unit 29 recognizes that the focus priority mode is selected by detecting a menu manipulation or a button manipulation and gives an instruction to each unit. Specifically, the first switching control unit 30 that performs switching between the focus priority mode and the operation speed priority mode is instructed to switch to the focus priority mode.

Furthermore, for example, if the AF control is being executed, the amplification factor determination unit 28 is instructed to execute amplification factor determination processing in order to perform the AF control with high accuracy, so that the diaphragm value setting unit 27 can adjust the diaphragm value on the basis of the determination result.

Note that even if the focus priority mode is selected, it is not necessary to suppress the amplification factor in the AGC processing to be equal to or less than the predetermined value in order to perform the AF control with high accuracy if the AF control is not performed, for example, as in the live view and the like. However, in a case where a manipulation for starting the AF control is performed, it is necessary to operate the diaphragm mechanism by setting the diaphragm value according to the determination result of the amplification factor, and there is a possibility that the start of the AF control is delayed. Accordingly, in the present embodiment, in order to quickly start the AF control, the diaphragm value setting unit 27 executes adjustment of the diaphragm value by instructing the amplification factor determination unit 28 to execute the amplification factor determination processing in the live view in a state where the focus priority mode is selected.

The manipulation recognition unit 29 recognizes that the operation speed priority mode is selected and gives an instruction to each unit. Specifically, the switching to the operation speed priority mode is instructed to the first switching control unit 30. Furthermore, for example, if the AF control is being executed in the still image capturing mode, an instruction is given to the diaphragm value setting unit 27 to continue keeping the diaphragm value of the diaphragm mechanism 20 according to the imaging setting so that image capturing according to the still image capturing instruction based on the imaging setting can be quickly executed.

Furthermore, in a case where the operation speed priority mode is selected in the live view, the manipulation recognition unit 29 issues different instructions according to a setting as to whether or not to reflect the imaging setting in the through image. The setting for reflecting the imaging setting in the through image is described as "imaging setting reflection ON". Furthermore, a setting that does not reflect the imaging setting in the through image is described as "imaging setting reflection OFF".

In a case where the operation speed priority mode is selected in the live view when the imaging setting reflection is ON, the manipulation recognition unit 29 maintains the diaphragm value according to the imaging setting. For example, the diaphragm value setting unit 27 may be instructed to set a diaphragm value according to imaging setting. Furthermore, in a case where the diaphragm value according to the imaging setting has already been set, it is not necessary to perform the instruction to the diaphragm value setting unit 27 again.

In a case where the operation speed priority mode is selected in the live view when the imaging setting reflection is OFF, the manipulation recognition unit 29 gives an instruction such that display not reflecting various imaging settings is performed on the display unit 10. For example, an instruction is given to the camera signal processing unit 8 or the like such that an image for which various types of processing, such as white balance adjustment, correction processing among R, G, and B color channels, luminance correction processing, color adjustment processing, and contrast adjustment processing have not been performed on the captured image signal supplied from the imaging unit 7, is displayed on the display unit 10.

Furthermore, in this case, the instruction given from the manipulation recognition unit 29 to the diaphragm value setting unit 27 is based on, for example, general diaphragm control. Specifically, for example, an instruction is given to set the diaphragm value corresponding to an average luminance value or a maximum luminance value of the captured image signal.

The manipulation recognition unit 29 recognizes the switching manipulation of imaging setting reflection ON/OFF and gives a switching instruction to the second switching control unit 31 that switches the imaging setting reflection ON/OFF.

The first switching control unit 30 switches between the focus priority mode and the operation speed priority mode on the basis of the instruction from the manipulation recognition unit 29.

The second switching control unit 31 switches the imaging setting reflection ON/OFF on the basis of the instruction from the manipulation recognition unit 29.

FIG. 7 illustrates a summary of instructions given by the manipulation recognition unit 29 to the diaphragm value setting unit 27 according to combinations of respective modes and settings. As illustrated, during the AF control, the diaphragm value of the diaphragm mechanism 20 varies depending on whether the focus priority mode or the operation speed priority mode is set.

That is, in the focus priority mode, in order to perform the AF control with high accuracy, the diaphragm value is set so as to suppress the amplification factor of the AGC processing to be less than the predetermined value.

Furthermore, in the operation speed priority mode, in order to quickly perform still image capturing, the diaphragm value is set such that the diaphragm mechanism 20 is not operated at a time of pressing the shutter button 6S.

3. First Example of Diaphragm Value Setting Processing

Figure 8:
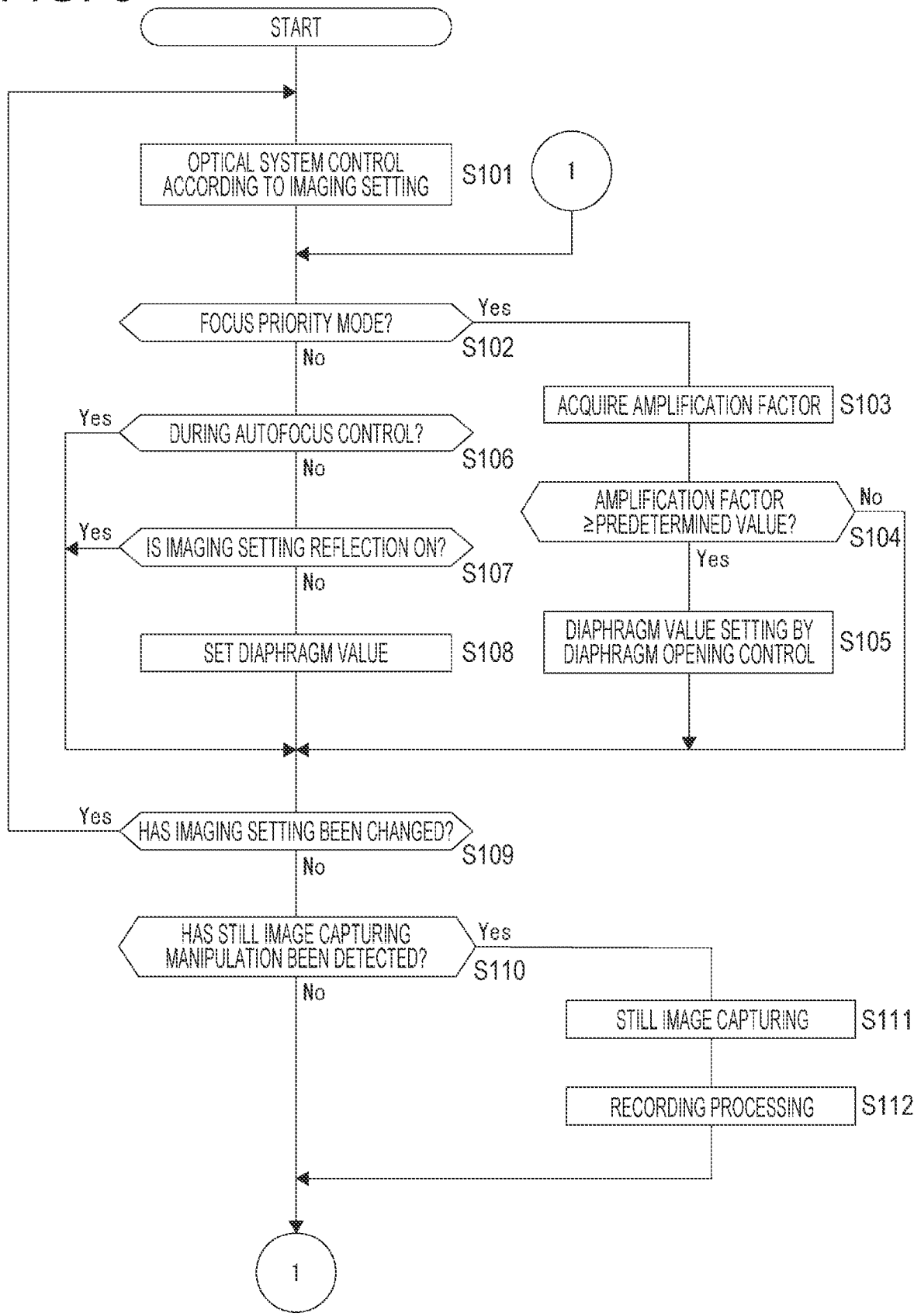
FIG. 8 is a flowchart of a first example of diaphragm value setting processing.

FIG. 8 illustrates a first example of processing related to diaphragm value setting executed by the camera control unit 14 in still image capturing. Note that each processing illustrated in FIG. 8 is extracted and illustrated only for control of the diaphragm mechanism 20 according to each mode and setting, and does not illustrate all the processing executed by the camera control unit 14 in the still image capturing.

When the still image capturing is started, the camera control unit 14 first controls the optical system 16 according to the imaging setting in step S101. This processing also includes processing of setting the diaphragm value of the diaphragm mechanism 20 according to the imaging setting set by the imaging person. The imaging setting may be determined by setting each item by the imaging person as described above, or may be determined by an algorithm that automatically sets an appropriate setting value based on an image capturing environment to each setting item in response to selection of automatic setting by the imaging person.

In step S102, the camera control unit 14 performs branch processing based on whether or not the mode is the focus priority mode. In a case where the focus priority mode is selected, the camera control unit 14 executes processing of acquiring the amplification factor of the AGC processing in step S103.

In step S104, the camera control unit 14 determines whether or not the amplification factor is equal to or more than the predetermined value. The predetermined value is a threshold for determining whether or not the AF control can be performed appropriately (or with high accuracy), and is a value set so that the noise component does not become too large. Specifically, in a case where a phase difference method is employed as the distance measurement method and the image plane phase difference pixels are provided in the imaging element 7a, the value is set as a value to be a branch point of whether or not distance measurement data with accuracy necessary for AF control can be acquired.

In a case where the amplification factor is equal to or more than the predetermined value, the camera control unit 14 sets the diaphragm value by diaphragm opening control in step S105. The diaphragm opening control is, for example, to set the diaphragm value to a minimum value in order to fully open the diaphragm mechanism 20.

After performing the diaphragm opening control, the camera control unit 14 proceeds to processing of step S109. Furthermore, in a case where the amplification factor is less than the predetermined value (step S104: No determination), that is, in a case where the noise component is small and distance measurement data with accuracy necessary for the AF control can be acquired without any problem, the camera control unit 14 proceeds to the processing of step S109 without performing the diaphragm opening control. The diaphragm value in this case remains at the value set according to the imaging setting in step S101.

The description returns to step S102.

In a case where the focus priority mode is not selected, that is, in a case where the operation speed priority mode is selected, the processing proceeds from the processing of step S102 to the processing of step S106.

In step S106, the camera control unit 14 performs branch processing based on whether or not the AF control is being performed.

In a case where it is determined that the AF control is not being performed, for example, in a case where the shutter button 6S is not half-pressed, the camera control unit 14 performs branch processing based on whether or not the imaging setting reflection is ON in step S107.

In a case where the imaging setting reflection is not ON, that is, a case where it is an AF non-control state and the imaging setting reflection is OFF, the camera control unit 14 sets the diaphragm value in step S108. The diaphragm value set in step S108 is determined according to an algorithm employed in a case where the imaging setting reflection is OFF. For example, the diaphragm value is determined according to the average luminance value or the maximum luminance value of the captured image signal.

In a case where the AF control is being performed due to half-pressing of the shutter button 6S or the like (step S106: Yes determination) or in a case where the imaging setting reflection is ON (step S107: Yes determination), the camera control unit 14 proceeds to the processing of step S109 without performing the processing of step S108. In this case, the diaphragm value according to the imaging setting set in step S101 remains valid.

In step S109, the camera control unit 14 performs branch processing according to whether or not the imaging setting has been changed. In a case where the imaging setting has been changed, the camera control unit 14 returns to the processing of step S101 and controls the optical system 16 according to the imaging setting after change.

On the other hand, in a case where the imaging setting has not been changed, the camera control unit 14 performs branch processing according to whether or not the still image capturing manipulation has been detected in step S110.

For example, in a case where a still image capturing manipulation such as pressing of the shutter button 6S is detected, the camera control unit 14 performs still image capturing in step S111, and performs still image recording processing in step S112. Furthermore, processing such as displaying a still image recorded on the display unit 10 may be executed.

The camera control unit 14 that has finished capturing and recording the still image returns to the processing of step S102. Furthermore, also in a case where the still image capturing manipulation is not detected, the camera control unit 14 returns to the processing of step S102.

Note that the processing of detecting the still image capturing manipulation illustrated in FIG. 8 is incorporated in one flowchart for convenience of description, and in practice, each processing of steps S111 and S112 may be executed by executing an event-driven program in response to detection of pressing of the shutter button 6S.

4. Second Example of Diaphragm Value Setting Processing

A second example of processing related to the setting of the diaphragm value will be described with reference to FIG. 9.

In the second example, unlike the first example, a lower diaphragm value set in a case where the amplification factor is high is set as close as possible to the imaging setting.

Processes similar to those in the first example are denoted by the same reference numerals as those in FIG. 8, and description thereof will be omitted as appropriate.

In the second example, in the focus priority mode (step S102: Yes determination), in a case where the amplification factor is equal to or more than the predetermined value (step S104: Yes determination), the camera control unit 14 performs the diaphragm opening control in step S105A. In the diaphragm opening control in step S105A, a new diaphragm value obtained by lowering the current diaphragm value by one step is set without setting the minimum diaphragm value.

Furthermore, the camera control unit 14 that has completed the processing of step S105A returns to the processing of step S102. That is, in the focus priority mode and while the amplification factor is higher than the predetermined value, steps S102, S103, S104, and S105A are continuously executed, so that the diaphragm mechanism 20 is gradually opened and the amplification factor of the AGC processing gradually decreases.

Then, when the amplification factor becomes less than the predetermined value, the diaphragm value is determined, and the processing proceeds to determination processing in steps S109 and S110. That is, since the diaphragm value in a case where the still image capturing manipulation is detected (step S110: Yes determination) is close to the diaphragm value according to the imaging setting set in step S101, the driving amount of the diaphragm mechanism 20 is reduced at a time of still image capturing.

Thus, it is possible to achieve both of high-speed capturing of a still image while suppressing the amplification factor to less than a certain value.

Figure 9:
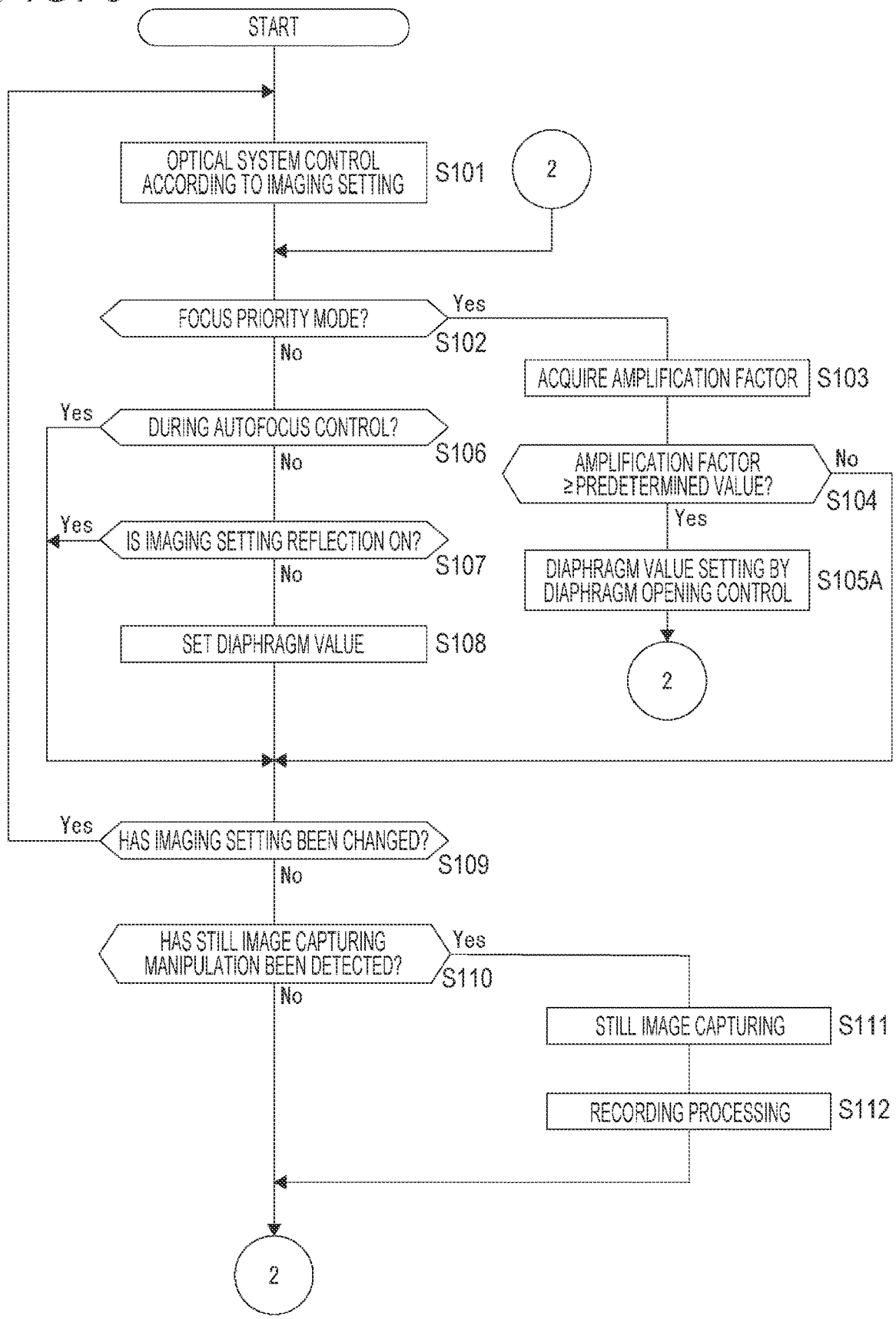
FIG. 9 is a flowchart of a second example of diaphragm value setting processing.

Note that, in FIG. 9, the processing may proceed to the determination processing in steps S109 and S110 without returning to the processing of step S102 after the processing of step S105A. Even in this case, each processing of steps S102, S103, S104, S105A, S109, and S110 is continuously executed, so that a value close to the diaphragm value according to the imaging setting is obtained.

Thus, even while the diaphragm value is continuously changed, the still image capturing operation by detecting the still image capturing manipulation can be implemented.

Note that, even in a case where the amplification factor is not less than the predetermined value as a result of repeatedly executing step S105A, since the diaphragm mechanism 20 is controlled by the diaphragm value smaller than the diaphragm value according to the imaging setting, it is possible to achieve higher accuracy of the AF control than in a case where the AF control is started with the imaging setting as it is.

5. Modification Example

In the example described above, although an example in which the diaphragm value is set according to the amplification factor regardless of whether or not the AF control is being performed in a case where it is the focus priority mode has been described, the diaphragm value may be varied depending on whether or not the AF control is being performed even in the focus priority mode.

For example, if it is in the focus priority mode and the AF control is being performed, each processing of steps S103, S104, and S105 in FIG. 8 is executed, and when the AF control is not being performed, the diaphragm value by the optical system control according to the imaging setting may be employed.

This makes it easy to see the through image displayed on the display unit 10 in a case where AF is not being executed.

Furthermore, in such a case, a proximity sensor for detecting whether or not the finger has approached the manipulation element 6 (for example, the shutter button 6S) for starting the AF control may be provided in the imaging device 1, and each processing of steps S103, S104, and S105 of FIG. 8 may be performed in a case where the proximity sensor detects the approach of the finger. That is, by bringing the finger close to the shutter button 6S to start the AF control in the focus priority mode, the diaphragm value corresponding to the amplification factor of the AGC processing is set at a stage before the AF control is executed. Therefore, it is possible to achieve quick and accurate AF control accompanying the start of the AF control.

6. Summary

In each of the examples described above, an autofocus control unit (AF control unit 26) that performs operation of autofocus (AF operation) according to a predetermined manipulation (for example, a half-pressing manipulation of the shutter button 6S), and a diaphragm mechanism control unit (diaphragm value setting unit 27, diaphragm mechanism driver 17a, and the like) that performs opening and closing control of a diaphragm mechanism 20 according to an amplification factor of a distance measurement signal (for example, the amplification factor of AGC processing) during the operation of autofocus (during AF control) are provided.

Thus, during the operation of autofocus, control different from control of the diaphragm mechanism based on imaging setting is performed.

For example, opening control of the diaphragm mechanism 20 is performed so that the amplification factor of automatic gain control (AGC) does not excessively increase. Therefore, it is possible to suppress a decrease in accuracy of autofocus control due to an insufficient light reception amount in an imaging element 7a.

As described in the first example and the second example of the diaphragm value setting processing, the diaphragm mechanism control unit (the diaphragm value setting unit 27, the diaphragm mechanism driver 17a, and the like) may perform specific diaphragm opening control (the processing of step S105 or step S105A) of decreasing a diaphragm value of the diaphragm mechanism 20 in a case where the amplification factor is equal to or more than a predetermined value during the operation of autofocus.

Thus, an increase in noise components is suppressed in a case where imaging is performed in a dark environment where the light reception amount of the imaging element 7a is small.

Therefore, insufficient accuracy of the autofocus control is prevented.

As described in the first example of the diaphragm value setting processing, the diaphragm mechanism control unit (the diaphragm value setting unit 27, the diaphragm mechanism driver 17a, and the like) may set the diaphragm value of the diaphragm mechanism 20 to a minimum value (process of step S105) as the specific diaphragm opening control in a case where the amplification factor is equal to or more than the predetermined value during the operation of autofocus.

That is, in a case where the amplification factor is equal to or more than the predetermined value, control is performed to open the diaphragm mechanism 20 to the maximum.

Therefore, the light reception amount received by the imaging element 7a can be sufficiently secured, and a decrease in accuracy of the autofocus control can be suppressed.

As described in the first example and the second example of the diaphragm value setting processing, the diaphragm mechanism control unit (the diaphragm value setting unit 27, the diaphragm mechanism driver 17a, and the like) may cause the diaphragm value of the diaphragm mechanism 20 to become a first diaphragm value (the diaphragm value set in step S101) according to an imaging setting in a case where the amplification factor is less than a predetermined value during the operation of autofocus.

The first diaphragm value according to the imaging setting is, for example, a diaphragm value according to the setting of the imaging person, a diaphragm value automatically calculated on the basis of the imaging environment at a time of automatic setting, or the like.

Thus, for example, if it is still image capturing, setting of the diaphragm value of the diaphragm mechanism is equivalent to the diaphragm value applied at a time of pressing the shutter button 6S, or the like.

Therefore, since it is not necessary to re-drive the diaphragm mechanism 20 in accordance with the imaging setting at the time of image capturing, it is possible to achieve a quick shutter operation. Furthermore, occurrence of noise due to drive sound can be suppressed, and escape of the subject, and the like can be prevented.

As described in step S105 and step S105A of the first example and the second example of the diaphragm value setting processing, the diaphragm mechanism control unit (the diaphragm value setting unit 27, the diaphragm mechanism driver 17a, and the like) may perform the specific diaphragm opening control in a case where the amplification factor is equal to or more than the predetermined value during non-operation of autofocus and during display of a live view image (that is, the live view described in each example).

During display of the live view image, a diaphragm mechanism different from the imaging setting is controlled.

Therefore, the accuracy of the autofocus control can be enhanced. Thus, an appropriate focus state of the image capturing target can be maintained.

As described in the first example and the second example of the diaphragm value setting processing, a switching control unit (first switching control unit 30) that switches between a focus priority mode and an operation speed priority mode may be provided, and the diaphragm mechanism control unit (the diaphragm value setting unit 27, the diaphragm mechanism driver 17a, or the like) may perform the specific diaphragm opening control in a case where the amplification factor is equal to or more than the predetermined value during the operation of autofocus in the focus priority mode, and cause a diaphragm value of the diaphragm mechanism 20 to be a first diaphragm value according to an imaging setting during the operation of autofocus in the operation speed priority mode.

Thus, in the focus priority mode, the amplification factor can be reduced by opening the diaphragm mechanism 20.

Therefore, it is possible to suppress deterioration of the focus state due to insufficiency of the light reception amount of the imaging element 7a. Furthermore, in the operation speed priority mode, by setting the diaphragm value of the diaphragm mechanism in accordance with the imaging setting, it is possible to achieve a quick shutter operation at a time of image capturing such as at a time of pressing the shutter button 6S.

As exemplified in the description of the manipulation recognition unit 29, a manipulation element that switches between the focus priority mode and the operation speed priority mode may be provided.

Thus, the focus priority mode and the operation speed priority mode can be switched by the will of the imaging person.

Therefore, the imaging device 1 can achieve an operation according to the purpose of the imaging person. Note that the manipulation element may be a manipulation element dedicated to switching, or a manipulation element used to switch a mode, such as a menu button or a determination button, but may be a manipulation element used for other manipulations.

Furthermore, the manipulation element may be a physical button or the like, or may be a virtual button displayed on a display unit 10 or the like.

As described in the first example and the second example of the diaphragm value setting processing, whether or not to reflect the imaging setting in a display image to be displayed on a display unit 10 (for example, the rear monitor 4) may be switchable, and the diaphragm mechanism control unit (the diaphragm value setting unit 27, the diaphragm mechanism driver 17a, and the like) may cause the diaphragm value of the diaphragm mechanism 20 to be the first diaphragm value according to the imaging setting in a case of reflecting the imaging setting (imaging setting reflection ON) during non-operation of autofocus and during display of a live view image in the operation speed priority mode, and may perform the specific diaphragm opening control in a case where the amplification factor is equal to or more than the predetermined value either in a case of reflecting the imaging setting or a case of not reflecting the imaging setting (that is, with the imaging setting reflection being either ON or OFF) during non-operation of autofocus and during display of the live view image in the focus priority mode.

Thus, in the focus priority mode, the specific diaphragm opening control is executed regardless of whether or not the imaging setting is reflected. That is, the diaphragm mechanism 20 can be opened in the display of the live view image.

Thus, a focus state for the image capturing target can be appropriately secured.

Furthermore, since the light reception amount of the imaging element 7a can be appropriately secured even during non-operation of autofocus in the focus priority mode, autofocus control using an image plane phase difference pixel 21A can be performed even immediately after starting the operation of autofocus.

Moreover, even if the operation of autofocus is started in the focus priority mode, there is a high possibility that the diaphragm mechanism 20 does not need to be operated largely, and generation of operation sound can be suppressed, so that a possibility of escape of the subject can be reduced.

As described in the first example and the second example of the diaphragm value setting processing, the diaphragm mechanism control unit (the diaphragm value setting unit 27, the diaphragm mechanism driver 17a, and the like) may set a diaphragm value in such a manner that the amplification factor is less than a predetermined value.

For example, the diaphragm mechanism 20 is opened so as to suppress the amplification factor of the automatic gain control to be less than the predetermined value.

Thus, an increase in noise is suppressed, and appropriate autofocus control can be performed.

As described in the second example of the diaphragm value setting processing, the diaphragm mechanism control unit (the diaphragm value setting unit 27, the diaphragm mechanism driver 17a, and the like) may set the diaphragm value to a second diaphragm value (the diaphragm value set in step S105A) closest to the first diaphragm value (the diaphragm value set in step S101) after a condition with respect to the amplification factor is satisfied during the operation of autofocus.

Thus, the diaphragm value can be made close to the imaging setting while securing the light reception amount of the imaging element 7a.

Therefore, it is possible to achieve both improvement in accuracy of the autofocus control and quick shutter operation.

As described in the imaging element 7a, the distance measurement signal may be a signal output on the basis of an image plane phase difference pixel 21A.

Since the distance measurement signal using the image plane phase difference pixel 21A increases in noise accompanying an increase in amplification factor, distance measurement accuracy decreases. Therefore, there is a possibility that the accuracy of the autofocus control based on the distance measurement signal decreases. According to this configuration, since the amplification factor is suppressed to be low by appropriate control of the diaphragm mechanism 20, an appropriate distance measurement signal can be acquired.

Thus, the accuracy of the autofocus control can be improved.

As described above, the diaphragm mechanism control unit (the diaphragm value setting unit 27, the diaphragm mechanism driver 17a, and the like) may perform opening and closing control of the diaphragm mechanism 20 according to the amplification factor in a still image capturing mode.

During recording in the moving image capturing mode, it is difficult to apply a setting of the diaphragm mechanism different from the imaging setting since it is in a state where the captured image is always recorded.

On the other hand, if it is in the still image capturing mode, since the image to be recorded is not captured except at a time of pressing the shutter button 6S, it is possible to set the diaphragm value of the diaphragm mechanism 20 different from that of the imaging setting. Furthermore, it is preferable because the autofocus control is appropriately performed by setting the diaphragm value of the diaphragm mechanism 20 different from the imaging setting, and a captured image in an appropriate focus state can be recorded in a case where the shutter button 6S is actually pressed.

A diaphragm mechanism control method for performing the diaphragm mechanism control described above performs opening and closing control of a diaphragm mechanism 20 according to an amplification factor of a distance measurement signal during operation of autofocus according to a predetermined manipulation.

Note that effects described in the present description are merely examples and are not limited, and other effects may be provided.

7. Present Technology

The present technology can employ configurations as follows.

(1)

An imaging device including:

an autofocus control unit that performs operation of autofocus according to a predetermined manipulation; and a diaphragm mechanism control unit that performs opening and closing control of a diaphragm mechanism according to an amplification factor of a distance measurement signal during the operation of autofocus.

(2)

The imaging device according to (1) above, in which the diaphragm mechanism control unit performs specific diaphragm opening control of decreasing a diaphragm value of the diaphragm mechanism in a case where the amplification factor is equal to or more than a predetermined value during the operation of autofocus.

(3)

The imaging device according to (2) above, in which the diaphragm mechanism control unit sets the diaphragm value of the diaphragm mechanism to a minimum value as the specific diaphragm opening control in a case where the amplification factor is equal to or more than the predetermined value during the operation of autofocus.

(4)

The imaging device according to any one of (1) to (3) above, in which the diaphragm mechanism control unit causes the diaphragm value of the diaphragm mechanism to become a first diaphragm value according to an imaging setting in a case where the amplification factor is less than a predetermined value during the operation of autofocus.

(5)

The imaging device according to any one of (2) to (3) above, in which the diaphragm mechanism control unit performs the specific diaphragm opening control in a case where the amplification factor is equal to or more than the predetermined value during non-operation of autofocus and during display of a live view image.

(6)

The imaging device according to any one of (2) to (3) above, further including a switching control unit that switches between a focus priority mode and an operation speed priority mode, in which the diaphragm mechanism control unit performs the specific diaphragm opening control in a case where the amplification factor is equal to or more than the predetermined value during the operation of autofocus in the focus priority mode, and causes a diaphragm value of the diaphragm mechanism to be a first diaphragm value according to an imaging setting during the operation of autofocus in the operation speed priority mode.

(7)

The imaging device according to (6) above, further including a manipulation element that switches between the focus priority mode and the operation speed priority mode.

(8)

The imaging device according to any one of (6) to (7) above, in which whether or not to reflect the imaging setting in a display image to be displayed on a display unit is switchable, and the diaphragm mechanism control unit causes the diaphragm value of the diaphragm mechanism to be the first diaphragm value according to the imaging setting in a case of reflecting the imaging setting during non-operation of autofocus and during display of a live view image in the operation speed priority mode, and performs the specific diaphragm opening control in a case where the amplification factor is equal to or more than the predetermined value either in a case of reflecting the imaging setting or a case of not reflecting the imaging setting during non-operation of autofocus and during display of the live view image in the focus priority mode.

(9)

The imaging device according to any one of (1) to (8) above, in which the diaphragm mechanism control unit sets a diaphragm value in such a manner that the amplification factor is less than a predetermined value.

(10)

The imaging device according to (4), (6), (7), or (8) above, in which the diaphragm mechanism control unit sets the diaphragm value to a second diaphragm value closest to the first diaphragm value after a condition with respect to the amplification factor is satisfied during the operation of autofocus.

(11)

The imaging device according to any one of (1) to (10) above, in which the distance measurement signal is a distance measurement signal output on the basis of an image plane phase difference pixel.

(12)

The imaging device according to any one of (1) to (11) above, in which
the diaphragm mechanism control unit performs opening and closing control of the diaphragm mechanism according to the amplification factor in a still image capturing mode.

(13)

A diaphragm mechanism control method including
performing opening and closing control of a diaphragm mechanism according to an amplification factor of a distance measurement signal during operation of autofocus according to a predetermined manipulation.

REFERENCE SIGNS LIST

1 Imaging device
6 Manipulation element
14 Camera control unit
17a Diaphragm mechanism driver
18 Optical system control unit
20 Diaphragm mechanism
21A Image plane phase difference pixel
26 AF control unit
27 Diaphragm value setting unit
29 Manipulation recognition unit
30 First switching control unit

The invention claimed is:

1. An imaging device, comprising:
an autofocus control unit that performs operation of autofocus according to a predetermined manipulation; and
a diaphragm mechanism control unit that performs opening and closing control of a diaphragm mechanism according to an amplification factor of a distance measurement signal during the operation of autofocus.

2. The imaging device according to claim 1, wherein
the diaphragm mechanism control unit performs specific diaphragm opening control of decreasing a diaphragm value of the diaphragm mechanism in a case where the amplification factor is equal to or more than a predetermined value during the operation of autofocus.

3. The imaging device according to claim 2, wherein
the diaphragm mechanism control unit sets the diaphragm value of the diaphragm mechanism to a minimum value as the specific diaphragm opening control in a case where the amplification factor is equal to or more than the predetermined value during the operation of autofocus.

4. The imaging device according to claim 1, wherein
the diaphragm mechanism control unit causes a diaphragm value of the diaphragm mechanism to become a first diaphragm value according to an imaging setting in a case where the amplification factor is less than a predetermined value during the operation of autofocus.

5. The imaging device according to claim 2, wherein
the diaphragm mechanism control unit performs the specific diaphragm opening control in a case where the amplification factor is equal to or more than the predetermined value during non-operation of autofocus and during display of a live view image.

6. The imaging device according to claim 2, further comprising a switching control unit that switches between a focus priority mode and an operation speed priority mode, wherein
the diaphragm mechanism control unit performs the specific diaphragm opening control in a case where the amplification factor is equal to or more than the predetermined value during the operation of autofocus in the focus priority mode, and causes the diaphragm value of the diaphragm mechanism to be a first diaphragm value according to an imaging setting during the operation of autofocus in the operation speed priority mode.

7. The imaging device according to claim 6, further comprising
a manipulation element that switches between the focus priority mode and the operation speed priority mode.

8. The imaging device according to claim 6, wherein
whether or not to reflect the imaging setting in a display image to be displayed on a display unit is switchable, and
the diaphragm mechanism control unit,
causes the diaphragm value of the diaphragm mechanism to be the first diaphragm value according to the imaging setting in a case of reflecting the imaging setting during non-operation of autofocus and during display of a live view image in the operation speed priority mode, and
performs the specific diaphragm opening control in a case where the amplification factor is equal to or more than the predetermined value either in a case of reflecting the imaging setting or a case of not reflecting the imaging setting during the non-operation of autofocus and during the display of the live view image in the focus priority mode.

9. The imaging device according to claim 1, wherein
the diaphragm mechanism control unit sets a diaphragm value in such a manner that the amplification factor is less than a predetermined value.

10. The imaging device according to claim 4, wherein
the diaphragm mechanism control unit sets the diaphragm value to a second diaphragm value closest to the first diaphragm value after a condition with respect to the amplification factor is satisfied during the operation of autofocus.

11. The imaging device according to claim 1, wherein
the distance measurement signal is a distance measurement signal output on a basis of an image plane phase difference pixel.

12. The imaging device according to claim 1, wherein
the diaphragm mechanism control unit performs opening and closing control of the diaphragm mechanism according to the amplification factor in a still image capturing mode.

13. A diaphragm mechanism control method, comprising:
performing opening and closing control of a diaphragm mechanism according to an amplification factor of a distance measurement signal during operation of autofocus according to a predetermined manipulation.

* * * * *